Nov. 28, 1950   W. E. TAIT ET AL   2,531,653
FILM CASSETTE FOR CAMERAS
Filed June 30, 1949   5 Sheets-Sheet 1

INVENTORS
WILFRED E. TAIT
AUGUST W. STELLPFLUG
BY William S. Gluck
ATTORNEY

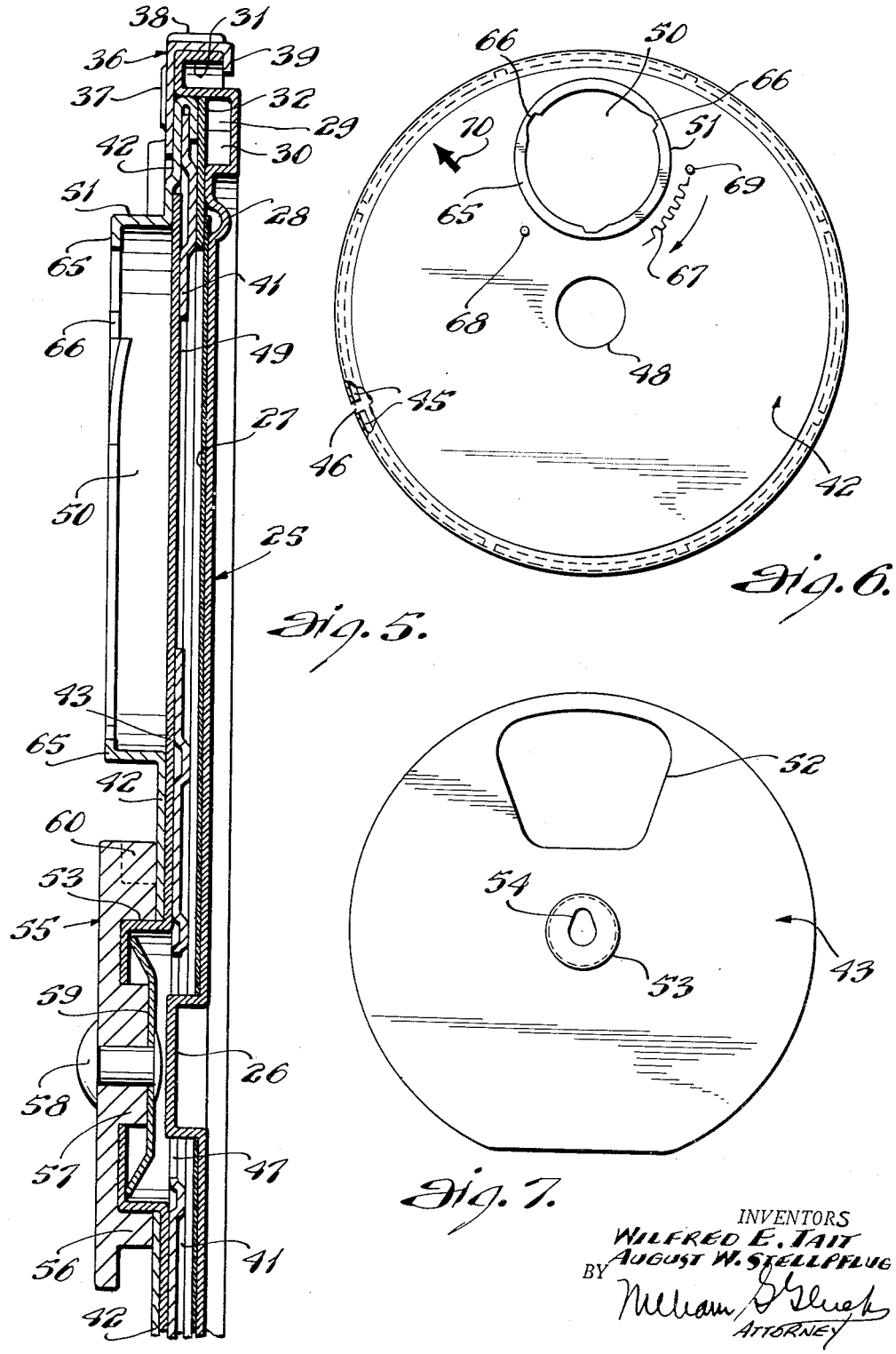

Nov. 28, 1950    W. E. TAIT ET AL    2,531,653
FILM CASSETTE FOR CAMERAS
Filed June 30, 1949    5 Sheets-Sheet 3
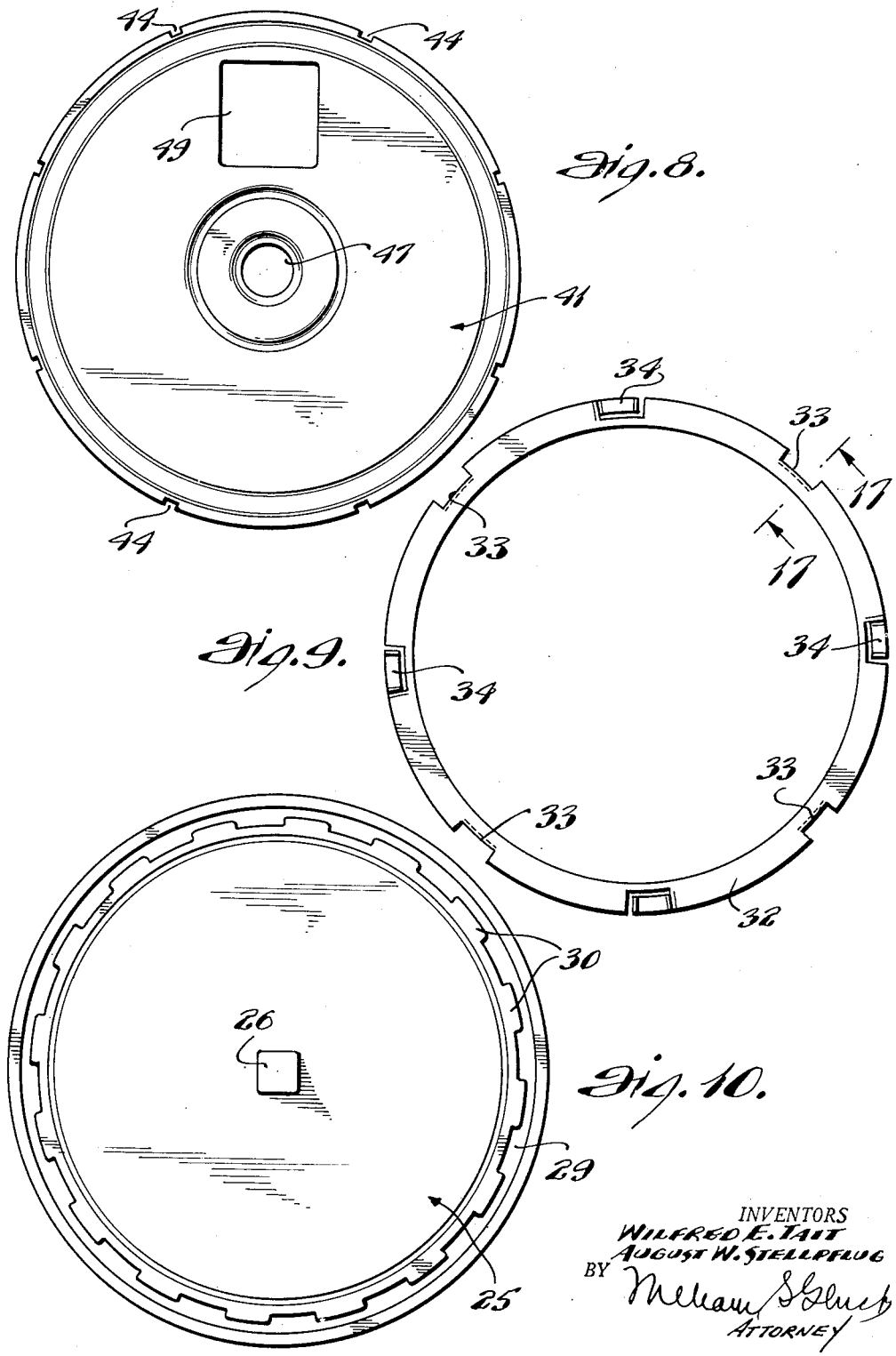

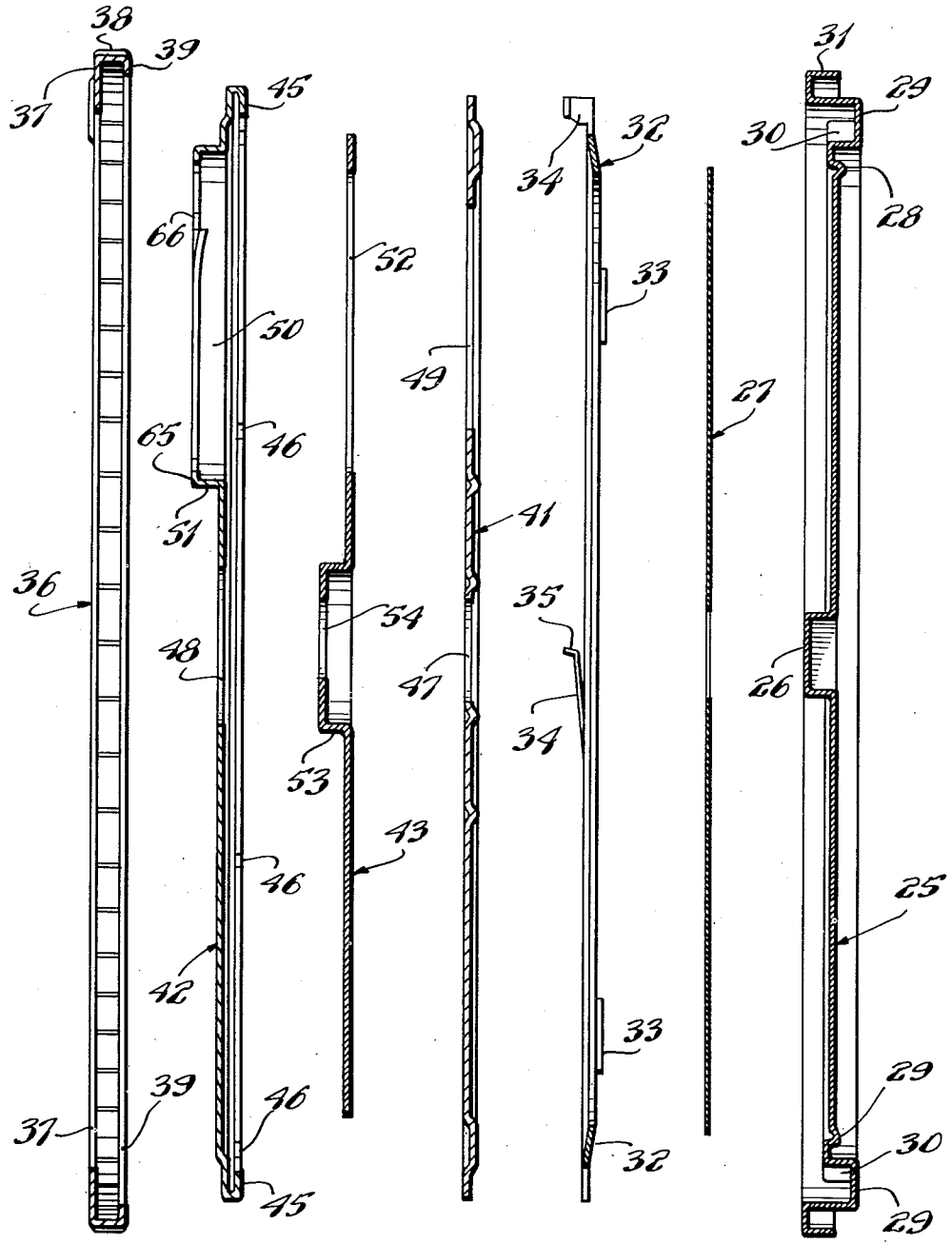

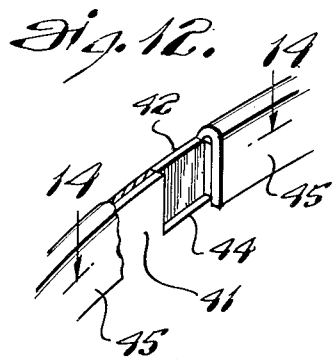
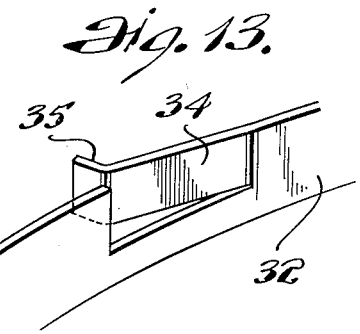
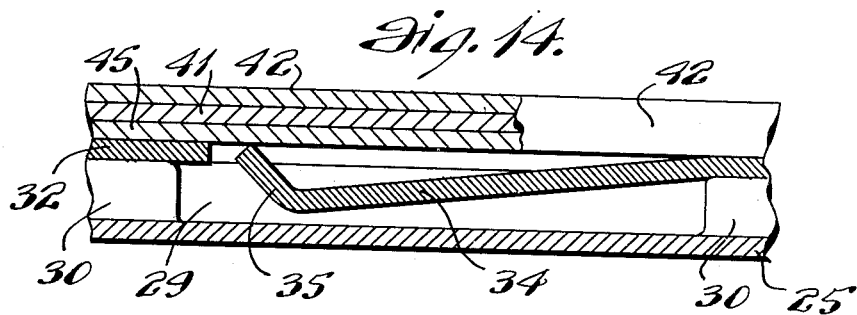
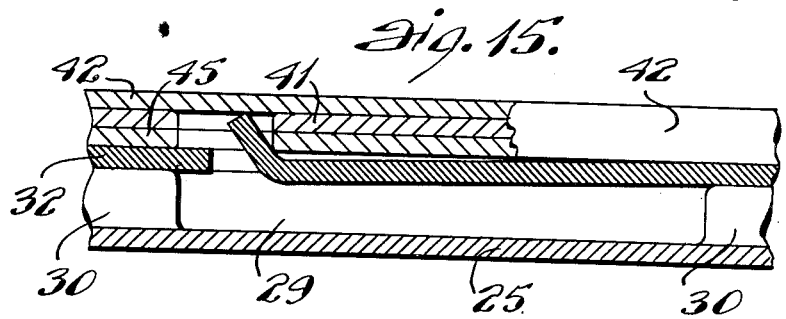
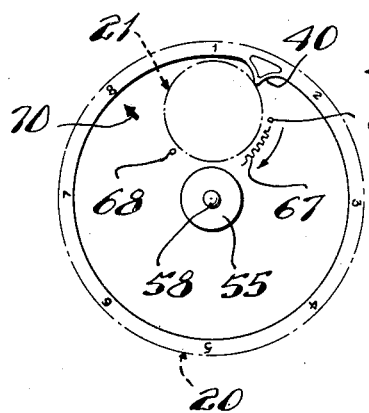
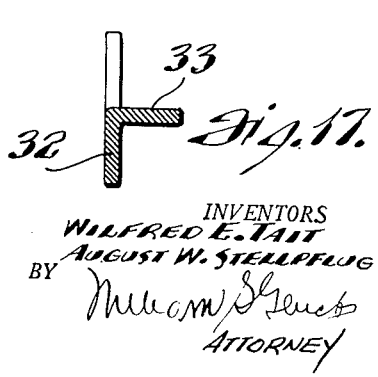

Patented Nov. 28, 1950

2,531,653

UNITED STATES PATENT OFFICE 2,531,653

FILM CASSETTE FOR CAMERAS

Wilfred E. Tait and August W. Stellpflug, New Canaan, Conn., assignors to American Safety Razor Corporation, Brooklyn, N. Y., a corporation of Virginia Application June 30, 1949, Serial No. 102,242

11 Claims. (Cl. 95—38)

Our present invention relates generally to cameras, and has particular reference to cameras employing light-tight film cassettes of the disc type such as disclosed in our application Ser. No. 746,496, filed May 7, 1947, and of which this application is a continuation in part.

A cassette of the character referred to consists essentially of a film-supporting base and a cover, one being rotatable with respect to the other. The cover is provided with an aperture with which there is associated an aperture shutter adapted to be moved into and out of aperture-closing position.

In a camera of the kind to which this invention relates, an image-forming unit is removably attached to the cassette cover in alignment with the aperture. With the aperture shutter open, photographic images may be formed upon successive areas of the film in the cassette by actuating the image-forming unit and rotating the cassette cover, relative to the underlying film, between operations.

In a camera of this type, it is a general object of our invention to provide improvements which contribute to the creation of a precision instrument of compact and attractive character, relatively simple and reliable in operation, and unusually capable of safeguarding the sensitized photographic film against accidental or improper exposure to light.

Among the more particular objects of the invention is the provision of a means which operates automatically to open the aperture shutter of the cassette when the image-forming unit is attached, and to close the aperture shutter when the unit is detached. In this way, the camera is automatically brought into a condition for picture-taking as the user attaches the image-forming unit to a freshly loaded cassette, and the cassette is automatically restored into a light-tight condition after the film in it has been fully exposed.

In the preferred embodiment of the invention, the means for attaching the image-forming unit to the cassette cover is of a character which involves movement of the unit in one direction parallel to the cover to effect attachment, and a reverse movement to effect detachment; and a means is provided whereby the aperture shutter is caused to open automatically during the first of said movements and to close automatically during the reverse movement.

Other objects of the invention relate to the provision of improved arrangements for shifting the cassette cover relative to the film, for bringing the image-forming unit more accurately and reliably into proper relation to successive areas of the film, for preventing inadvertent reverse movement of the cassette cover relative to the film, and for blocking further relative movement after the film has been completely exposed to the contemplated extent.

These general objectives and advantages, and such others as may hereinafter appear or be pointed out, can be achieved in the manner illustratively exemplified in the accompanying drawings, in which—

Fig. 5 is an enlarged cross-sectional view taken substantially along the line 5—5 of Fig. 2;

Fig. 6 is an obverse view of the element which constitutes the outer wall of the cassette cover;

Fig. 7 is a similar view of the aperture shutter;

Fig. 8 is a similar view of the rear wall of the cassette cover;

Fig. 9 is a similar view of a detent ring forming part of the rear wall of the cassette;

Fig. 10 is a similar view of the rear or film-supporting wall of the cassette;

Fig. 11 is an exploded view of the parts entering into the construction of the cassette, including the film carried thereby, all shown in cross-section;

Fig. 12 is a fragmentary perspective view of a detail of the cassette cover assembly;

Fig. 13 is a fragmentary perspective view of a detail of the detent ring;

Figs. 14 and 15 are enlarged cross-sectional views illustrating the mode of functioning of the detent shown in Fig. 13;

Fig. 16 is a view similar to Fig. 1 with the cassette cover and base in the extreme opposite relationship which they assume after the film has been completely exposed; and Fig. 17 is a cross-sectional view taken substantially along the line 17—17 of Fig. 9.

Figure 1:
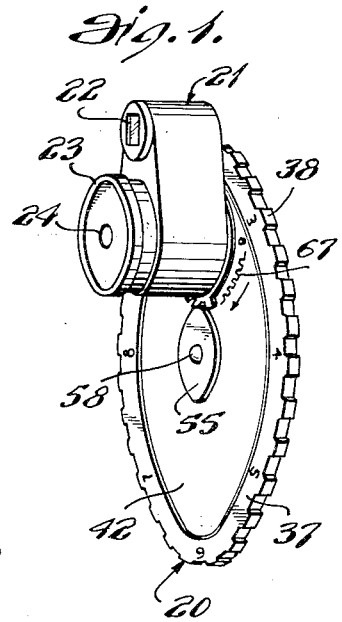
Fig. 1 is a perspective view of a camera of the present improved character, completely assembled and ready for use.

In Fig. 1 the cassette 20 is shown in association with the image-forming unit 21, in the relationship which these parts assume when the camera is ready for use. The cassette 20 is preferably of circular contour. The unit 21 is mounted in an eccentric position and is provided with a part which projects beyond the periphery of the cassette 20, and serves as a finder. The front window of this finder is indicated at 22. The rear window or lens, to which the eye of the operator is applied, is not visible in Fig. 1. The unit 21 is also provided with a circular housing 23 for a lens and shutter of the usual variety. The details of this interior structure of the unit 21 have not been shown in the present drawings. Suffice it to point out that the light from the subject to be photographed enters the body 21 in the region 24, upon actuation of a shutter in the usual way. The image is transmitted rearwardly through the unit 21 and through an aperture in the cassette 20, and onto the underlying region of the film that is used in the cassette.

The cassette itself is best illustrated in Figs. 5–11. The parts entering into its construction are shown in exploded relation in Fig. 11.

The rear wall or base of the cassette is a disc-shaped body 25 having a non-circular, preferably square, projection 26 on its front (i. e., its inner) face. This is shown most clearly in Fig. 10. The projection 26 serves properly to locate on the front face of the element 25 a sensitized film 27 having a correspondingly-shaped opening at its center. It is believed unnecessary to show an obverse view of the film. An end view is shown in Fig. 11, and the film is shown mounted upon the cassette base 25 in Fig. 5.

The film has a diameter which positions its peripheral edge approximately over the annular depression 28 which is formed in the element 25 near its outer edge. Radially beyond the depression 28, the element 25 is formed with a deeper and wider annular depression 29, and within the confines of this depression the element 25 is deformed to provide a series of circumferentially spaced elevations 30, the purpose of which will be presently explained.

At its extreme outer edge, the element 25 turns forwardly to approximately the plane of the front face of the projection 26, then outwardly and rearwardly to define a peripheral face 31.

Two elements of the cassette are secured to the base 25 in immovable relation thereto, as distinguished from others which are intended to rotate relative to the base 25. One of the immovable elements is a ring 32 (see Figs. 9 and 11). This ring is provided with circumferentially spaced rearwardly-directed tongues 33 (see Fig. 17). We have shown four such tongues arranged at 90° intervals. Each of the tongues is preferably formed as an integral rearwardly-deflected part of the ring 32, and has a length substantially equal to the spacing between the elevations 30 in the depression 29 of the element 25. The tongues 33 fit into the depression 29, and the elevations 30 are so arranged that each of the tongues 33 is sandwiched between a pair of these elevations. This prevents the ring 32 from rotating relative to the element 25.

At spaced intervals between the tongues 33, the ring 32 is also provided with a set of forwardly-directed spring fingers 34. We have illustratively shown four such fingers arranged at 90° intervals. One of them is shown from the rear in Fig. 13. These fingers are preferably formed as integral struck-up parts of the ring 32. Each finger has springiness which urges it normally in a forward direction, i. e., into the position shown in Fig. 13. At its extreme end, the finger 34 has an outwardly bent part 35. The functions of the fingers 34, as resilient pawls, will be described hereinafter. Suffice it to point out at this time that the elevations 30 in the depression 29 of the element 25 are so positioned that when any finger 34 is deflected rearwardly, it will move freely into one of the spaces between a pair of the elevations 30.

Figure 2:
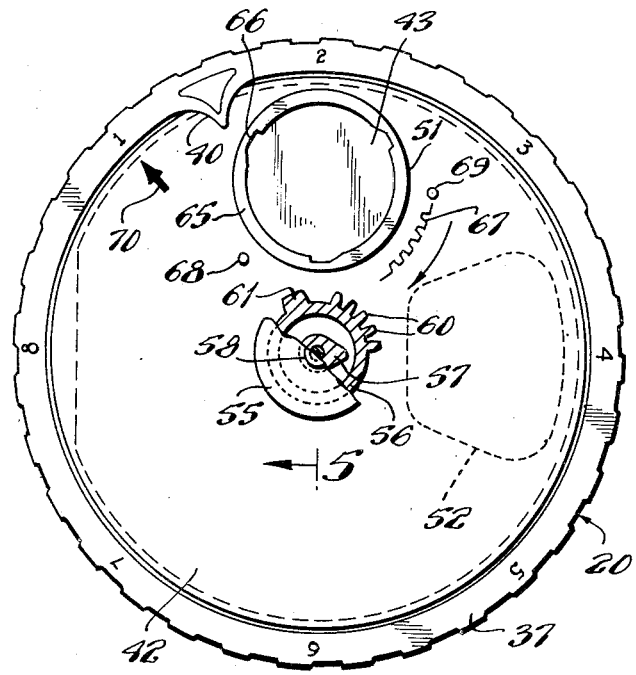
Fig. 2 is an obverse view of the film cassette by itself, with certain parts broken away to reveal the structure beneath.

The other of the elements which is immovably secured to the base 25 when the cassette has been assembled is the peripheral clamping ring 36 shown at the left end of Fig. 11, in Fig. 5, and also in Figs. 1 and 2. This ring has a part 37 which lies substantially in the plane of the cassette, and a peripheral part 38 which is adapted to engage over the peripheral face 31 of the element 25 and to be clamped thereto by turning in the rear edge of the ring 36 as indicated at 39. The peripheral surface 38 of the ring is preferably stepped or knurled as indicated most clearly in Figs. 1 and 2, to facilitate the engagement of the cassette by the user during the rotative movements of the parts which the operation of the camera calls for. The front part 37 of the ring 36 is provided with a series of suitably spaced indicia, such as the numbers "1" to "8" shown in Figs. 1 and 2.

In one region, preferably between the markings "1" and "2," the part 37 is provided with a projection which defines an abutment face 40 whose function will be made apparent hereinafter.

That part of the cassette assembly which rotates relative to the base 25 is an association of parts which conjointly define a cassette cover. This cover consists essentially of a pair of spaced plates having aligned openings which conjointly define an aperture. More particularly, the cover is made up of three elements, a rear element 41 (see Figs. 8 and 11), a front element 42 (see Figs. 6 and 11) and an intermediate element 43 (see Figs. 7 and 11).

The periphery of the element 41 is provided with a series of circumferentially spaced notches or recesses 44. These are evenly spaced, and there are preferably as many notches as there are number designations on the part 37. Thus, in the camera illustrated, where the film is intended to receive eight photographic impressions, there are eight numbers on the part 37 and eight notches 44 on the part 41.

The part 42 has a peripheral edge which is deflected rearwardly, as shown at 45, and clamps over the edge of the part 41, as shown most clearly in Figs. 5 and 12. This rearwardly-turned edge of the part 42 is interrupted at spaced intervals, as indicated at 46 in Fig. 6. These spaces correspond to the notches 44.

At its center, the element 41 is provided with a circular opening 47 which is greater in diameter than the diagonal of the projection 26, so that there is no interengagement between the part 41 and the projection 26. The element 42 is also provided with a central circular opening 48.

Eccentrically formed in the element 41 is an opening 49 which is preferably substantially rectangular, as shown. Formed in the element 42 there is an opening 50 in alignment with the opening 49, but the opening 50 is preferably circular and is formed by an upstanding part 51 configured in such a way as to facilitate attachment of the image-forming unit thereto.

Together, the openings 49 and 50 constitute an aperture in the cover of the cassette. This aperture is opened and closed by means of the element 43, which serves as a disc shutter. As shown most clearly in Fig. 7, the disc 43 is provided with an opening 52 of substantial size, When the opening 52 is aligned with the openings 49 and 50, the aperture in the cassette cover is open and light may pass rearwardly to the film supported on the base 25. When the disc 43 is shifted or rotated, so that the opening 52 is out of alignment with the openings 49 and 50 (as shown, for example, by the dotted lines in Figs. 2 and 3), the aperture in the cassette cover is closed and the cassette is in light-tight condition.

The shifting of the disc 43 is made possible by a rotative movement controlled from the exterior of the cassette cover. For this purpose, the disc 43 is provided with the forward projection 53, of circular contour, adapted to fit snugly but rotatably within the opening 48 in the element 42. Formed in the outer wall of the projection 53 is a non-circular hole 54 which may for example assume the oval shape shown in Fig. 7.

Engaging the boss 53 is a shutter control element 55 which is illustrated most clearly in Figs. 1–5. It has a rearwardly-projecting annular part 56 which fits snugly around the boss 53, and it has a central rearwardly-directed part 57 which is shaped to conform to the irregular opening 54, and fits snugly into this opening.

To hold the part 55 in permanent association with the boss 53, hence with the aperture shutter disc 43, a rivet 58 passes centrally through the element 55 and engages at its inner end a retaining washer or disc 59 which bears against the inner face of the boss 53.

Figure 3:
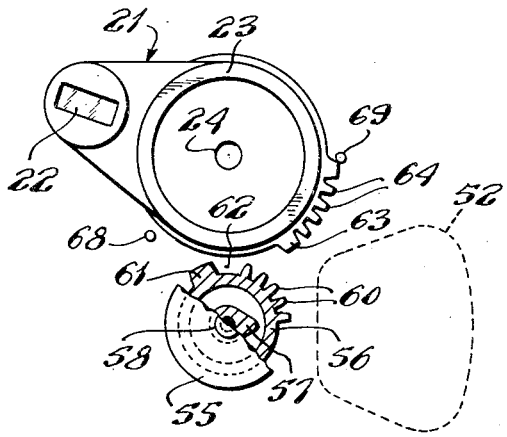
Figs. 3 and 4 are related diagrammatic views indicating the relative position of the image-forming unit, with respect to a cooperating part of the film cassette, during the process of attaching or detaching the unit.
Figure 4:
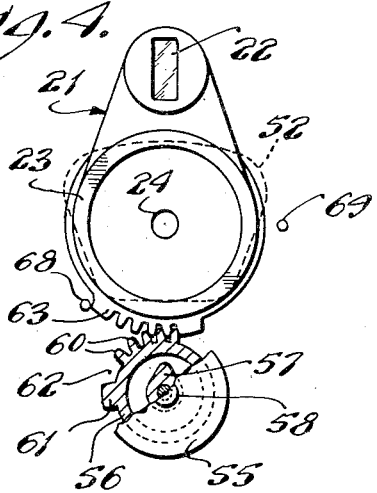

Formed on a part of the periphery of the annular flange 56 are a series of gear teeth 60, as indicated most clearly in Figs. 1, 3 and 4. There is preferably one large tooth 61, then a relatively large space 62, and then a series of about five normally-spaced teeth 60.

Formed on the periphery of the base of the image-forming unit 21 is a corresponding series of teeth, consisting preferably of a relatively large tooth 63 (Figs. 3 and 4), and a series of normally-shaped teeth 64. The teeth 63—64 define a toothed gear segment carried by the image-forming unit 21, while the teeth 60—61 define a cooperating toothed gear segment carried by the aperture shutter.

The attachment of the unit 21 to the cassette involves a movement of the unit, preferably a rotative movement, in one direction parallel to the cassette cover; and its detachment involves a reverse movement. In the embodiment illustrated, the unit 21 is adapted to be applied to and detached from the element 42 by means of a rotative movement.

With this objective in view, the part 51 has an in-turned flange 65 (Fig. 5) which is provided at intervals with recesses 66. The unit 21 is provided with a corresponding number of radially-projecting tongues (not shown) which can be brought into registry with the recesses 66 when the unit 21 is in the position shown in Fig. 3. By then rotating the unit 21 in a clockwise direction into the postion of Figs. 1 and 4, the tongues may be moved into positions beneath the flange 65 and thus hold the image-forming unit in position. This is a well-known type of interengagement between elements of this kind.

To facilitate the application of the unit 21, the element 42 is provided with a marking 67 which conforms to the shape of the teeth 64. When the user fits the unit 21 to the element 42 with the teeth 64 in registry with the markings 67, the tongues on the unit 21 are aligned with the recesses 66 and pass through them. Then, when the user rotates the unit 21 the engagement between the unit and the cassette is effected.

To limit this rotative movement during the attaching process, the element 42 is provided with an abutment 68 against which the tooth 63 abuts when the unit is fully attached. See Fig. 4. Similarly, to facilitate the detachment of the unit, the part 42 is provided with the abutment 69 against which the opposite end of the tooth segment 64 abuts the unit is ready to be withdrawn from the cassette. See Fig. 3.

During the rotative movement of the unit 21 from the position of Fig. 3 to that of Fig. 4, the tooth 63 encounters the tooth 61, and the teeth 64 mesh with the teeth 60, thereby automatically effecting a rotation of the element 55 from the position indicated in Figs. 2 and 3 into the position indicated in Fig. 4. This rotative movement of the element 55 brings about a corresponding rotative movement of the aperture shutter 43 from a position in which the opening 52 is located as in Figs. 2 and 3 to a position in which it is located as indicated in Fig. 4. Thus, the aperture in the cassette cover is automatically opened as the image-forming unit is attached to the cassette, and is automatically closed as the unit is detached.

The part 42 is also provided with a marking such as the arrow 70 which is caused to register with the number "1" on the rim 37 when the cassette is loaded with a new film.

In operation, a freshly loaded cassette is secured to the image-forming unit 21 in the manner described. The cassette is in light-tight condition when it is acquired by the user, and the aperture in the cassette cover is automatically opened when the unit 21 is attached. After the first photographic exposure has been made, the user grasps the unit 21 in one hand and grasps the cassette by its periphery with the other, then moves one relative to the other so that the marking "2" on the part 37 is brought into registry with the arrow or similar marking 70. This brings an adjacent part of the film into alignment with the image-forming unit, so that a second exposure may be made. A relative rotative movement between the base of the cassette, and the cover of the cassette, is again made after the second exposure, until the numeral "3" comes into registry with the marking 70. This procedure is repeated until after the eighth exposure has been made. If through inadvertence the user seeks to effect a further rotative movement, he is unable to do so, because the part 51 of the cassette cover is in abutment with the projection 40 carried by the cassette base. This relationship of parts is indicated diagrammatically in Fig. 16. When the parts are in this relation, the user detaches the image-forming unit 21 and is ready to submit the exposed film for processing. In the meantime, he can immediately attach his image-forming unit to a newly-loaded cassette.

The relative rotative movements of the cassette cover and base, between photographic exposures, are facilitated by the detent action of the resilient pawls 34. Whenever one of the numbers on the rim 37 is in registry with the marking 70, each of the tongues 34 is in the relative position shown in Fig. 15 with respect to the cassette cover. It will be observed that the springiness of the finger 34 positions the bent end 35 within one of the recesses 44. As the user starts to effect a rotative movement of the parts, the tongue 34 rides yieldably out of this cut-out, and assumes the retracted position shown in Fig. 14 until the next recess 44 is encountered, at which time the tongue snaps back into the relationship of Fig. 15.

Inadvertent rotative movement of the parts in the wrong direction is positively prevented, as will be apparent, by the inability of the bent end 35 to ride out of the corresponding cut-out 44 except when the parts are rotated in the permitted direction.

In general, it will be understood that many of the details herein described and illustrated may be modified by those skilled in the art without necessarily departing from the spirit and scope of the invention as expressed in the appended claims.

Having thus described our invention and illustrated its use, what we claim as new and desire to secure by Letters Patent is:

1. A light-tight film cassette for use with a detachable image forming unit to complete a camera, said cassette comprising a film-supporting base and a cover therefor, said cover having an aperture through which an image may be cast upon the underlying area of film supported on said base, said cover being mounted on said base for rotation relative thereto so that images may be successively cast upon different areas of said film, means on the cover for attaching said image forming unit and an abutment carried by said base and positioned to be encountered by said means after a predetermined successive number of rotative movements of the cover in one direction relative to the base.

2. A film holding cassette constructed as set forth in claim 1 wherein said means on the cover for attaching the image forming unit comprises an outwardly projecting collar adjacent the periphery of said cover and said abutment is a projection extending inwardly from the periphery of said base into the rotational path of movement of said collar.

3. A light-tight film cassette for use with a detachable image forming unit to complete a camera, said cassette comprising a base for supporting a sheet of sensitized film and having a peripheral edge extending beyond the marginal edges of said film, a rotatable cover having an aperture offset from its center through which an image may be successively cast upon different underlying areas of film supported on said base, said cover being rotatively secured on said base by means of a U-shaped clamping strip embracing the peripheral edges of the base and the cover, a collar on said cover surrounding said aperture for attachment of the image forming unit, and a projection extending from said clamping strip into the rotational path of movement of said collar whereby rotation of the cover with respect to the base is limited to substantially one complete revolution in one direction and a second exposure of an area of film previously exposed through the cover aperture is prevented.

4. A light-tight film cassette for use with a detachable image forming unit to complete a camera, said cassette comprising a film-supporting base and a cover therefor, said cover having an aperture through which an image may be cast upon the underlying area of film supported on said base, said cover being mounted on said base for rotation relative thereto so that images may be successively cast upon different areas of said film, means on the cover for attaching said image forming unit and an abutment carried by said base and positioned to be encountered by said means after a predetermined successive number of rotative movements of the cover in one direction relative to the base, and means to prevent reverse rotation of said cover.

5. A light-tight film cassette for use with a detachable image forming unit to complete a camera, said cassette comprising a film-supporting base and a cover therefor, said cover having an aperture through which an image may be cast upon the underlying area of film supported on said base, said cover being mounted on said base for rotation relative thereto so that images may be successively cast upon different areas of said film, means on the cover for attaching said image forming unit and an abutment carried by said base and positioned to be encountered by said means after a predetermined successive number of rotative movements of the cover in one direction relative to the base, and means to prevent reverse rotation of said cover, said means comprising a series of peripherally arranged recesses in said cover, and at least one resilient pawl carried by said base and adapted to ride into and out of engagement with successive recesses when the cover is rotated in the permitted directions.

6. A light-tight film cassette for use with a detachable image forming unit to complete a camera, said cassette comprising, a base for supporting a sheet of sensitized film and having a peripheral edge extending beyond the marginal edges of said film, a rotatable cover having an aperture offset from its center through which an image may be successively cast upon different under-lying areas of film supported on said base, said cover being rotatively secured on said base by means of a U-shaped clamping strip embracing the peripheral edges of the base and the cover, a collar on said cover surrounding said aperture for attachment of the image forming unit, and a projection extending from said clamping strip into the rotational path of movement of said collar whereby rotation of the cover with respect to the base is limited to substantially one complete revolution in one direction for prevention of double exposure of a previously exposed area of film and means to prevent reverse rotation of said cover, said means comprising a series of peripherally arranged recesses in said cover and at least one resilient pawl carried by said base and adapted to ride into and out of engagement with successive recesses when the cover is rotated in the permitted direction.

7. A light-tight film cassette for use with a detachable image forming unit to complete a camera, said cassette comprising, a disc-like base for supporting a sheet of sensitized film and having at least one recess in its periphery, a ring member abutting the base adjacent its periphery and prevented from rotation with respect thereto by a projection fitting into said recess, a cover rotatably secured to said base and having an aperture offset from its axis of rotation through which an image may be successively cast upon different underlying areas of film supported on said base, a series of peripherally arranged recessed in said cover, and at least one resilient pawl carried by said ring member and adapted to ride into and out of engagement with the successive recesses when the cover is rotated with respect to the base in one direction in such manner as to prevent rotation of the cover in the opposite direction.

8. A light-tight film cassette for use with a detachable image forming unit to complete a camera, said cassette comprising, a base for supporting a sheet of sensitized film, a cover rotatably mounted on said base and having an aperture offset from its axis of rotation through which an image may be successively cast upon different underlying areas of film, said cover comprising inner and outer plates rigidly secured together at their peripheral edges and spaced apart intermediate said edges, said aperture being formed by aligned openings in each of said plates, a shutter carried in the space between said plates and movable to open or close said cover aperture and means for moving said shutter extending through said outer plate for accessibility from the exterior of the cassette.

9. A light-tight film cassette for use with a detachable image forming unit to complete a camera, said cassette comprising, a base for supporting a sheet of sensitized film, a cover rotatably mounted on said base and having an aperture offset from its axis of rotation through which an image may be successively cast upon different underlying areas of film, said cover comprising inner and outer plates rigidly secured together at their peripheral edges and spaced apart intermediate said edges, said aperture being formed by aligned openings in each of said plates, a shutter rotatable in the space between said plates to positions opening and closing said cover aperture, and cooperating means on said cover and shutter for rotatably supporting the shutter with respect to the cover, said means comprising a socket on one and an interfitting boss on the other.

10. A light-tight film cassette for use with a detachable image forming unit to complete a camera, said cassette comprising, a base for supporting a sheet of sensitized film, a cover rotatably mounted on said base and having an aperture offset from its axis of rotation through which an image may be successively cast upon different underlying areas of film, said cover comprising inner and outer plates rigidly secured together at their peripheral edges and spaced apart intermediate said edges, said aperture being formed by aligned openings in each of said plates, a shutter in the space between the plates movable to positions opening and closing said cover aperture, a boss on the shutter extending outwardly through an aperture in the outer plate of said cover for rotatably supporting the shutter with respect to the cover, and a gear segment secured to said boss for actuating rotational movement of the shutter.

11. In combination, a light-tight film cassette of the disc type comprising, a film supporting base and a cover therefor, said cover being rotatably mounted on said base and having an aperture offset from its axis of rotation through which an image may be successively cast upon different underlying areas of film, a shutter between the cover and base movable to positions opening and closing said cover aperture, a boss on the shutter extending into a socket on said cover for rotatably supporting the shutter with respect to the cover, an image-forming unit, means for removably attaching said unit to said cover in alignment with said aperture, and means automatically operable to rotate said shutter to uncover said aperture as said unit is attached and to rotate said shutter to cover said aperture as said unit is detached, said last-named means comprising a gear segment on said image forming unit and a gear segment for meshing therewith on said shutter.

WILFRED E. TAIT.
AUGUST W. STELLPFLUG.

REFERENCES CITED

The following references are of record in the file of this patent:

UNITED STATES PATENTS

| Number | Name | Date |
|---|---|---|
| 517,539 | Casler | Apr. 3, 1894 |
| 1,955,300 | Kurnick | Apr. 17, 1934 |

FOREIGN PATENTS

| Number | Country | Date |
|---|---|---|
| 9,655 | Great Britain | July 27, 1886 |
| 202,046 | Great Britain | Aug. 13, 1924 |